United States Patent
Mori et al.

(10) Patent No.: US 8,755,374 B2
(45) Date of Patent: Jun. 17, 2014

(54) OPTICAL PACKET SWITCH DEVICE

(75) Inventors: Shota Mori, Kawasaki (JP); Wataru Kawasaki, Kawasaki (JP)

(73) Assignee: Fujitsu Telecom Networks Limited, Kawasaki-shi (JP)

( * ) Notice: Subject to any disclaimer, the term of this patent is extended or adjusted under 35 U.S.C. 154(b) by 218 days.

(21) Appl. No.: 13/338,035

(22) Filed: Dec. 27, 2011

(65) Prior Publication Data

US 2012/0163815 A1    Jun. 28, 2012

(30) Foreign Application Priority Data

Dec. 28, 2010  (JP) ................................ 2010-292520

(51) Int. Cl.
*H04L 12/66* (2006.01)

(52) U.S. Cl.
USPC ........................................... 370/352; 398/45

(58) Field of Classification Search
None
See application file for complete search history.

(56) References Cited

U.S. PATENT DOCUMENTS

| | | | |
|---|---|---|---|
| 2002/0171893 A1* | 11/2002 | Ishimaru ....................... | 359/135 |
| 2003/0179779 A1* | 9/2003 | Kim ............................... | 370/503 |
| 2004/0151421 A1* | 8/2004 | Yasue et al. ................... | 385/16 |
| 2005/0047392 A1* | 3/2005 | Ashwood Smith .......... | 370/351 |
| 2006/0222361 A1* | 10/2006 | Aoki ............................... | 398/51 |
| 2007/0115974 A1* | 5/2007 | Messenger ................... | 370/389 |
| 2009/0087194 A1* | 4/2009 | Nakashima et al. .......... | 398/158 |
| 2010/0272439 A1* | 10/2010 | Katayama et al. ............. | 398/59 |
| 2011/0026927 A1* | 2/2011 | Tanaka et al. ................... | 398/81 |

FOREIGN PATENT DOCUMENTS

| | | |
|---|---|---|
| JP | 2004-354612 | 12/2004 |
| JP | 2008-306555 | 12/2008 |

* cited by examiner

*Primary Examiner* — Phirin Sam
(74) *Attorney, Agent, or Firm* — Christie, Parker & Hale LLP

(57) ABSTRACT

An optical packet switch device includes an optical switch control section and an optical switch section. The optical switch control section includes a synchronization pattern detecting unit which detects a frame synchronization pattern from a parallel data signal and detects a delay bit number showing that the frame synchronization pattern is stored at a position shifted by how many bits from the first bit of the parallel data signal, a header analysis unit which analyzes a header and detects an optical packet length and route information of an optical packet signal, and an output competition determining unit which determines passing/discarding of the optical packet signals competing with each other based on the optical packet length and the route information detected by the header analysis unit and delay bit number information detected by the synchronization pattern detecting unit.

2 Claims, 13 Drawing Sheets

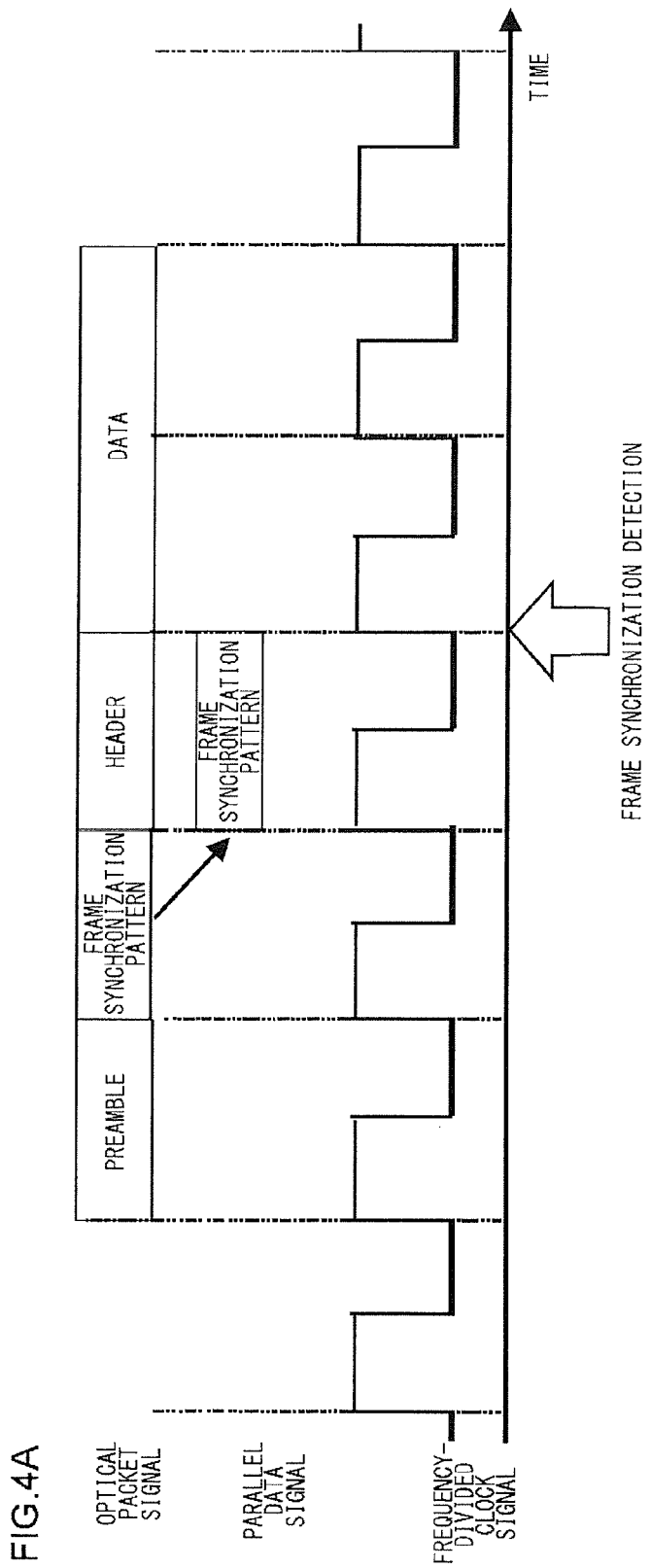

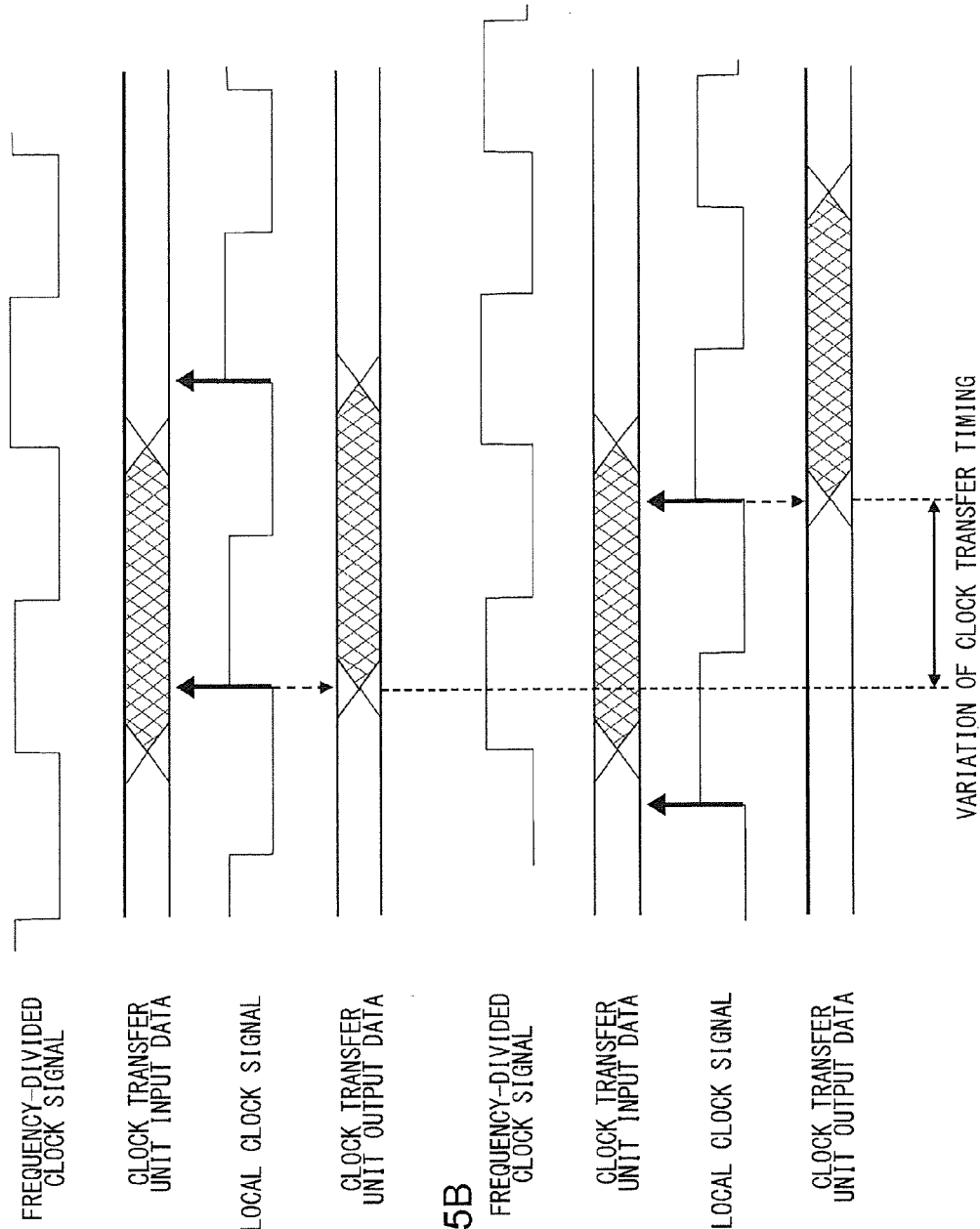

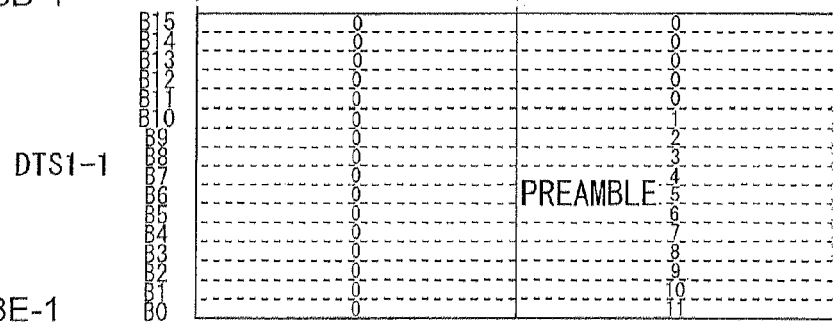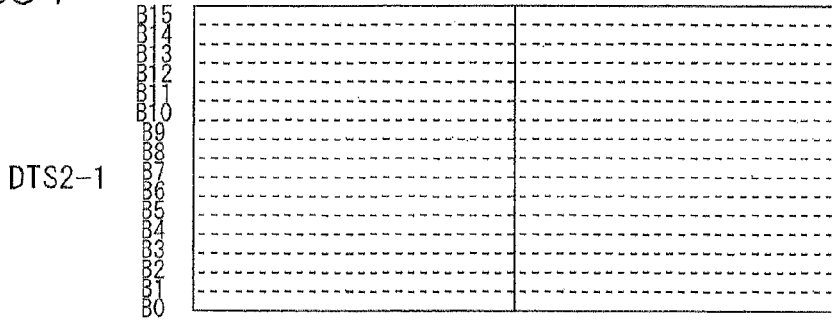

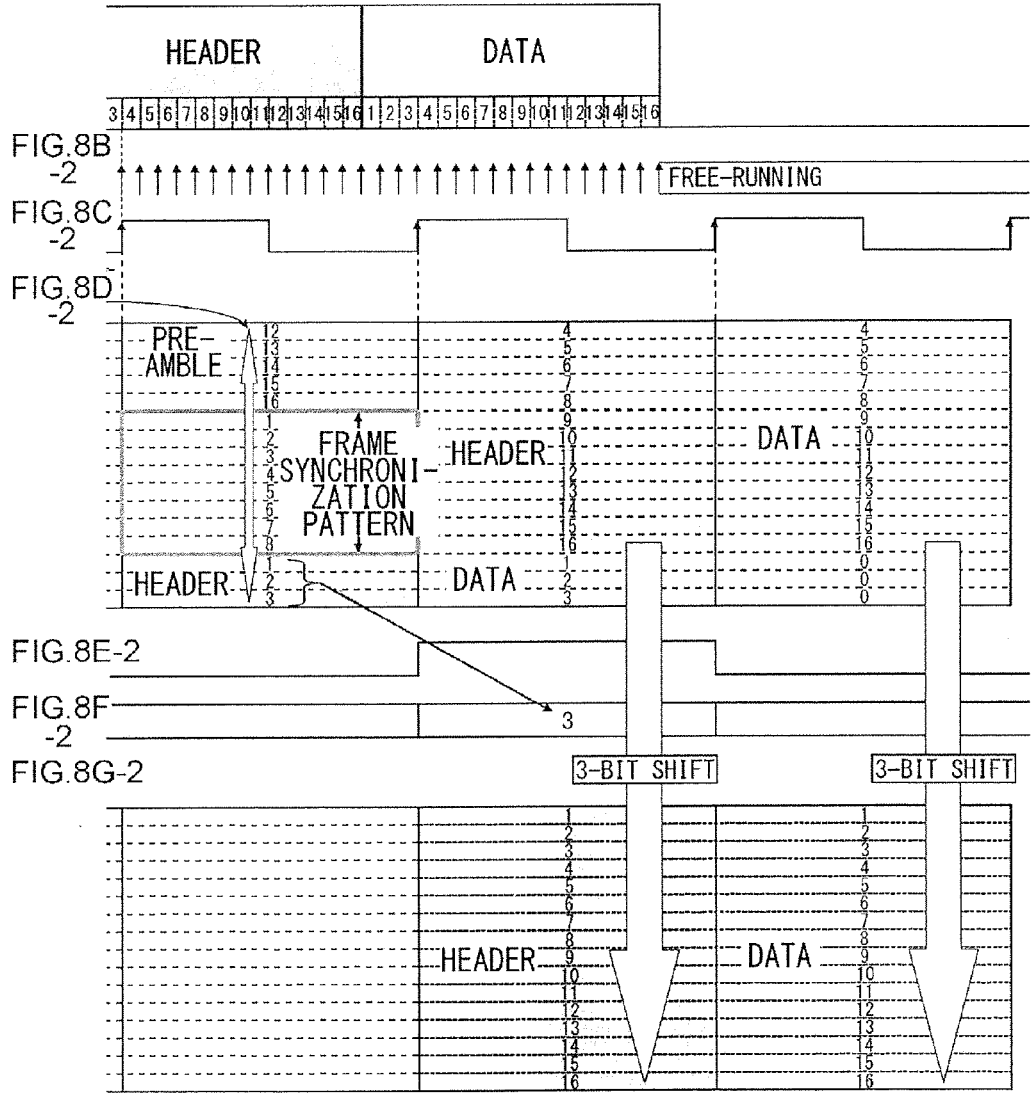

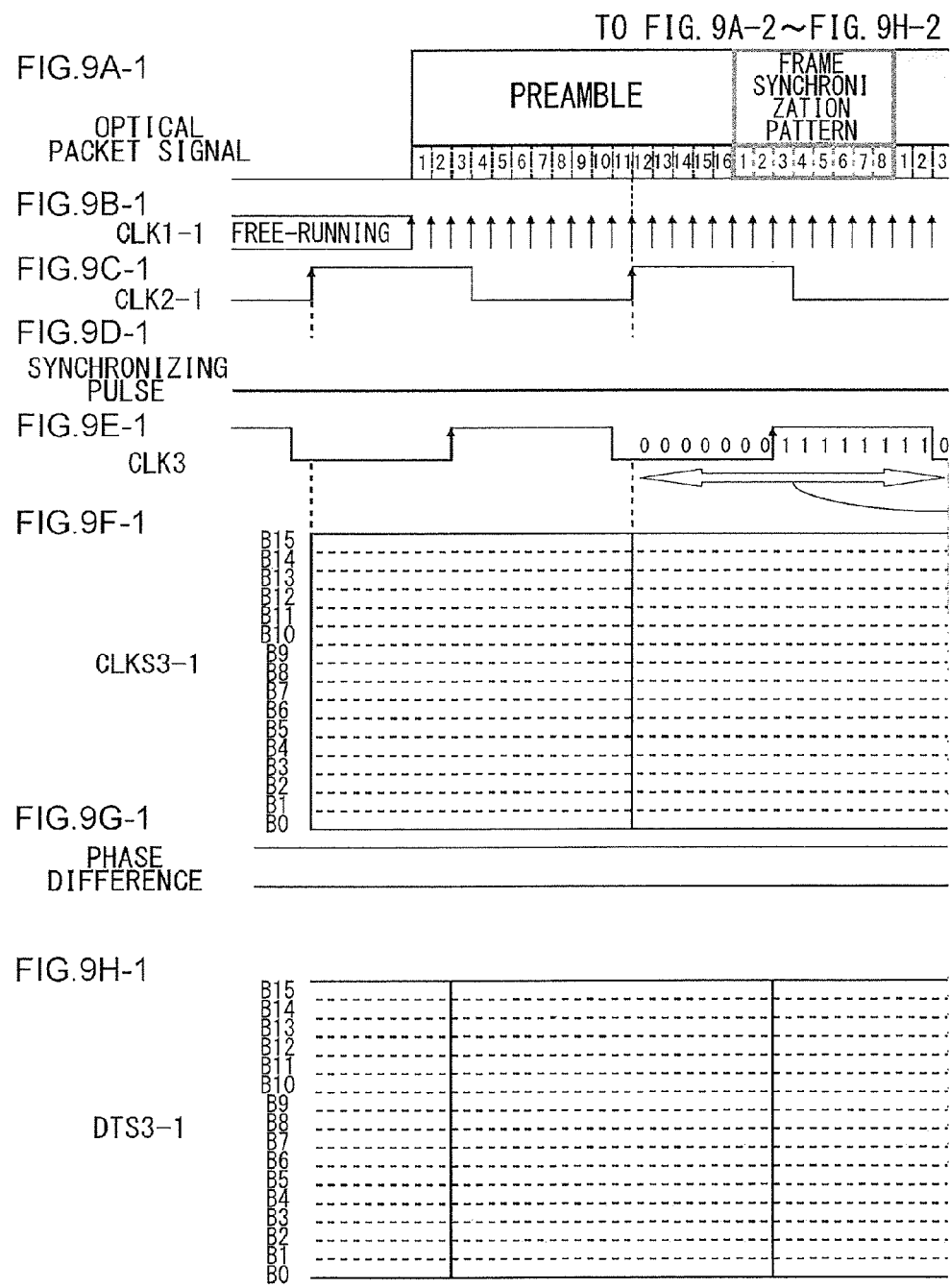

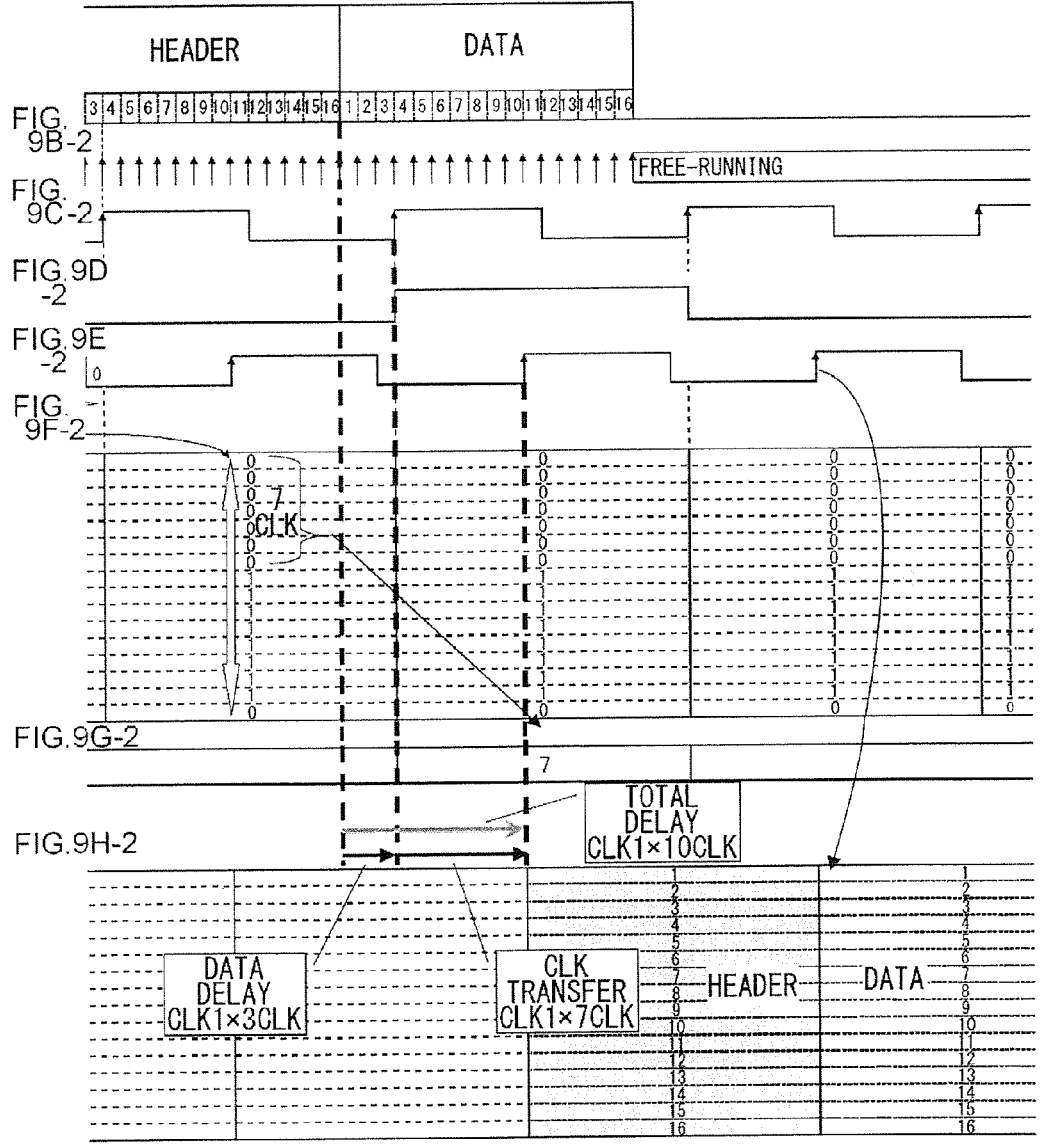

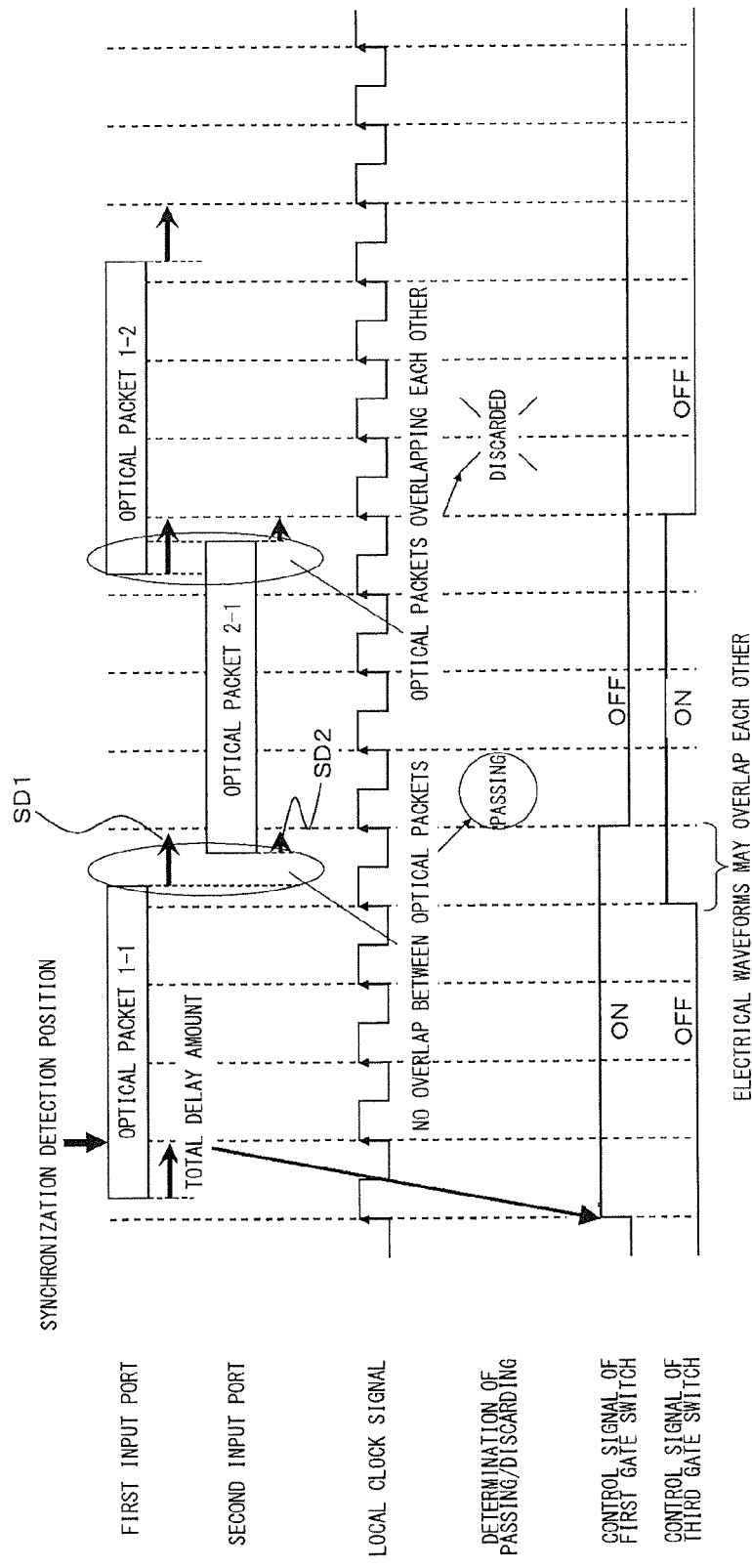

OPTICAL PACKET SWITCH DEVICE

CROSS-REFERENCE TO RELATED APPLICATION

This application claims priority to and the benefit of Japanese Patent Application Number 2010-292520, filed on Dec. 28, 2010.

BACKGROUND OF THE INVENTION

1. Field of the Invention

The present invention relates to an optical packet switch device which realizes packet switching in the unit of optical packet by switching an optical switch in accordance with route information given to an optical packet signal.

2. Description of the Related Art

In an optical transmission system using wavelength division multiplexing (WDM), a technique of switching a path in the unit of wavelength has been put to practical use by using a wavelength selective switch (WSS) and so on. As the next technique, there has been considered an optical packet switching method in which the unit for switching is an IP packet (such as a 10 G Ether (10 Gigabit Ethernet™) signal), for example, each IP packet is converted into an optical packet form, and a route is switched by an ultrafast optical packet switch device. The optical packet switching method may dramatically improve the band utilization efficiency of a transmission line and thus is a promising technique for the future. In the prior art, as the optical packet switch device used in the optical packet switching method, there have been known the optical packet switch devices disclosed in patent documents No. 1 and 2, for example.
[patent document No. 1] JP 2004-354612
[patent document No. 2] JP 2008-306555

In the optical packet switch device, when the first bit of a received optical packet signal passes, an optical switch can be brought into a turned-on state, and when the last bit passes, the optical switch can be brought into a turned-off state, whereby an interval between the optical packets (hereinafter also referred to as a guard time) can be reduced, and the band utilization efficiency of a transmission line can be improved.

However, since the received optical packet signal and an operation clock in a control circuit of the optical packet switch device are asynchronous, it is actually difficult to perform the above switch control, and the optical switch is in the turned-on state for a longer time than the actual optical packet signal passing time. If the time to continue the turned-on state of the optical switch is increased, the guard time is required to be increased corresponding thereto, and therefore, the band utilization efficiency of a transmission line is reduced.

Further, in the optical packet switch device, for example when the routes of two optical packet signals input to two input ports at substantially the same timing travel toward the same output port, such a determination is performed that the first input optical packet signal is passed, and the next input optical packet signal is discarded. Such a determination is referred to as "output competition determination". The output competition determination is usually performed by determining whether temporal overlap occurs in an electrical optical switch control signal. However, when the time when the optical switch is turned on is long as described above, even if the actual optical packet signals do not overlap temporally, the temporal overlap occurs in the optical switch control signal, and therefore, such a situation may occur that the optical packet signal is discarded. This leads to reduction in the packet loss rate and, furthermore, reduction in the band utilization efficiency of a transmission line.

SUMMARY OF THE INVENTION

In view of the above situations, the present invention provides an optical packet switch device which can improve the band utilization efficiency of a transmission line.

In order to solve the above problems, an optical packet switch device according to an embodiment of the present invention includes a branch portion which branches a received optical packet signal, an optical switch section which switches a route of one of the branched optical packet signals and outputs the optical packet signal, and an optical switch control section which extracts route information from the other branched optical packet signal and controls the optical switch section according to the route information. The optical switch control section includes a optical/electrical conversion unit which converts the other optical packet signal into an electrical data signal, a clock extracting unit which extracts a clock signal from the data signal, a serial/parallel conversion unit which converts the data signal into a parallel data signal, a frequency dividing unit which frequency-divides the clock signal and generates a frequency-divided clock signal, a synchronization pattern detecting unit which detects a frame synchronization pattern from the parallel data signal and detects a delay bit number showing that the frame synchronization pattern is stored at a position shifted by how many bits from the first bit of the parallel data signal, a header analysis unit which analyzes a header included in the parallel data signal and detects an optical packet length and the route information of the optical packet signal, and an output competition determining unit which determines passing/discarding of the optical packet signals competing with each other based on the optical packet length and the route information detected by the header analysis unit and delay bit number information detected by the synchronization pattern detecting unit.

The optical switch control unit may further includes a local oscillator which oscillates a local clock signal, a clock transfer unit which transfers the parallel data signal synchronized with the frequency-divided clock signal to the local clock signal, and a phase difference detecting unit which detects a phase difference between the frequency-divided clock signal and the local clock signal. The output competition determining unit may determine the passing/discarding of the optical packet signals competing with each other based on the optical packet length, the route information, and a total delay amount obtained by adding a delay amount, corresponding to the phase difference detected by the phase difference detecting unit, to a delay amount corresponding to the delay bit number.

The phase difference detecting unit may detect the phase difference with reference to a parallel signal obtained by serial/parallel converting the local clock signal by the clock signal.

Another aspect of the present invention is an optical packet switch device. The optical packet switch device includes a branch portion which branches a received optical packet signal, an optical switch section which switches a route of one of the branched optical packet signals and outputs the optical packet signal, and an optical switch control section which extracts route information from the other branched optical packet signal and controls the optical switch section according to the route information. The optical switch control section includes a optical/electrical conversion unit which converts the other optical packet signal into an electrical data signal, a clock extracting unit which extracts a clock signal from the data signal, a serial/parallel conversion unit which converts the data signal into a parallel data signal, a frequency dividing unit which frequency-divides the clock signal and generates a frequency-divided clock signal, a local oscillator which oscillates a local clock signal, a clock transfer unit which transfers the parallel data signal synchronized with the frequency-divided clock signal to the local clock signal, a phase difference detecting unit which detects a phase difference between the frequency-divided clock signal and the local clock signal, a header analysis unit which analyzes a header included in the parallel data signal and detects an optical packet length and the route information of the optical packet signal, and an output competition determining unit which determines passing/discarding of the optical packet signals competing with each other based on the optical packet length and the route information detected by the header analysis unit and a phase difference detected by the phase difference detecting unit.

An arbitrary combination of the above components and expression of the present invention replaced among devices, methods, systems, programs, and recording media storing programs are also effective as an aspect of the present invention.

BRIEF DESCRIPTION OF THE DRAWINGS

FIGS. 4A and 4B are views for explaining a variation of a frame synchronization detection timing;

FIGS. 5A and 5B are views for explaining a variation of a clock transfer timing;

FIGS. 8A-1 and 8A-2 to 8G-1 and 8G-2 are views for explaining a frame synchronization pattern detection processing and a parallel data signal rearrangement processing;

FIGS. 9A-1 and 9A-2 to 9H-1 and 9H-2 are views for explaining operation of a phase difference detecting unit;

FIG. 10 is a view for explaining operation of the optical packet switch device according to the present embodiment.

DETAILED DESCRIPTION OF THE INVENTION

The invention will now be described by reference to the preferred embodiments. This does not intend to limit the scope of the present invention, but to exemplify the invention.

Hereinafter, an optical packet switch device according to an embodiment of the present invention will be described with reference to the drawings. The optical packet switch device according to the present embodiment realizes the switching of a route in the unit of optical packet. The band utilization efficiency of a transmission line can be improved by switching the route in the unit of optical packet. First, the optical packet switch device studied by the present inventors will be described as a comparative example before description of the optical packet switch device according to the present embodiment.

Figure 1:
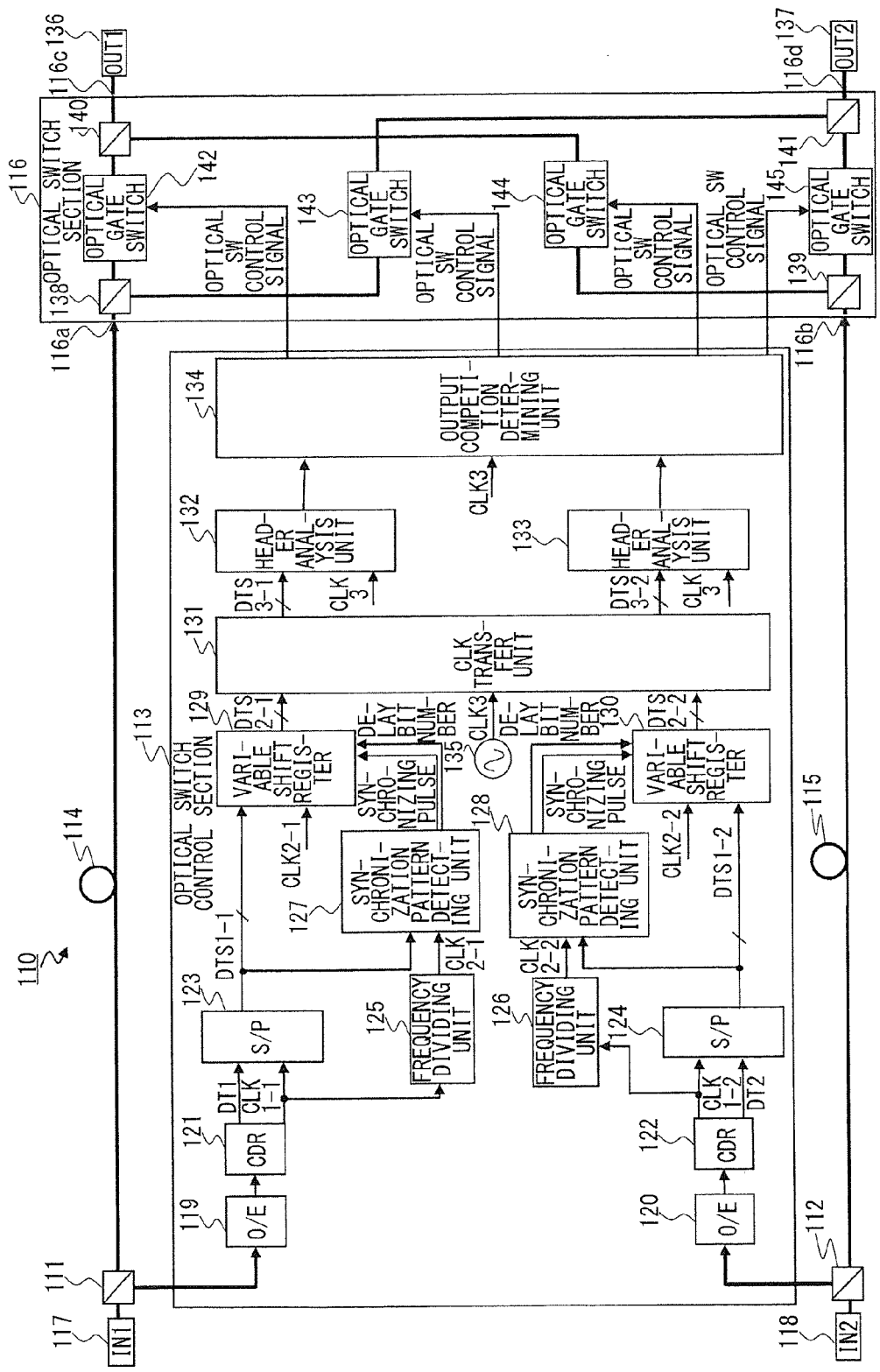
FIG. 1 is a view for explaining an optical packet switch device according to a comparative example.

FIG. 1 is a view for explaining an optical packet switch device 110 according to the comparative example. The optical packet switch device 110 is a two-input by two-output switch device. As shown in FIG. 1, the optical packet switch device 110 includes a first optical coupler 111, a second optical coupler 112, an optical switch control section 113, a first optical delay line 114, a second optical delay line 115, an optical switch section 116, a first input unit 117, a second input unit 118, a first output unit 136, and a second output unit 137.

The optical packet signal input to the first input unit 117 via an optical transmission line is branched into two optical packet signals by the first optical coupler 111. One of the branched optical packet signals is input to the optical switch control section 113, and the other optical packet signal is input to the optical switch section 116 via the first optical delay line 114. The optical packet signal input to the second input unit 118 via another optical transmission line is branched into two optical packet signals by the second optical coupler 112. One of the branched optical packet signals is input to the optical switch control section 113, and the other optical packet signal is input to the optical switch section 116 via the second optical delay line 115.

Figure 2:
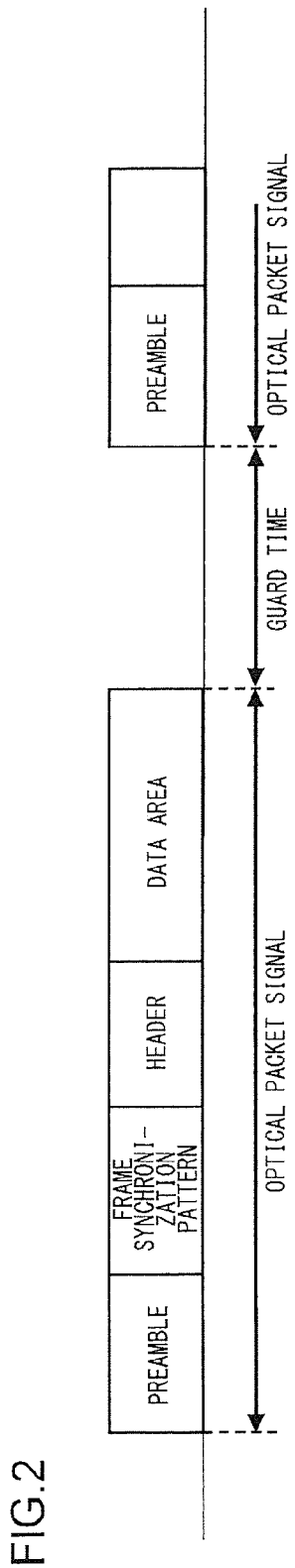
FIG. 2 is a view showing a configuration of an optical packet signal.

FIG. 2 shows a configuration of the optical packet signal. As shown in FIG. 2, the optical packet signal has a preamble, a frame synchronization pattern, a header, and a date area. The preamble is used for stabilization of a light receiver receiving the optical packet signal. The frame synchronization pattern is arranged behind the preamble and shows that the frame is started after that. The frame synchronization pattern is used for establishment of frame synchronization. The frame synchronization pattern is also referred to as a start of frame delimiter (SFD). The header includes at least optical packet length information and route information of the optical packet signal. The optical packet signal may be an optical packet signal such as 10 G Ether.

In the optical packet switching method, as shown in FIG. 2, a no-signal section referred to as a guard time is provided between adjacent optical packet signals. The shorter the guard time is, the higher the band utilization efficiency of a transmission line is, and therefore, for the optical packet switching method, the degree of the reduction of the guard time is important as a performance index.

Returning to FIG. 1, the optical switch control section 113 extracts the route information from the optical packet signal and outputs a control signal to the optical switch section 116 according to the route information. As shown in FIG. 1, the optical switch control section 113 includes a first optical/electrical conversion unit 119, a second optical/electrical conversion unit 120, a first CDR (Clock Data Recovery) unit 121, a second CDR unit 122, a first serial/parallel conversion unit 123, a second serial/parallel conversion unit 124, a first frequency dividing unit 125, a second frequency dividing unit 126, a first synchronization pattern detecting unit 127, a second synchronization pattern detecting unit 128, a first variable shift register 129, a second variable shift register 130, a clock transfer unit 131, a local oscillator 135, a first header analysis unit 132, a second header analysis unit 133, and an output competition determining unit 134.

The first optical/electrical conversion unit 119 converts the optical packet signal received from the first optical coupler 111 into an electrical signal. Meanwhile, the second optical/electrical conversion unit 120 converts the optical packet signal received from the second optical coupler 112 into an electrical signal.

The first CDR unit 121 receives the electrical signal from the first optical/electrical conversion unit 119 and separates the electrical signal into a data signal DT1 and a clock signal CLK1-1. The second CDR unit 122 receives the electrical signal from the second optical/electrical conversion unit 120 and separates the electrical signal into a data signal DT2 and a clock signal CLK1-2.

The first serial/parallel conversion unit 123 serial/parallel converts the data signal DT1 and outputs a parallel data signal DTS1-1. The second serial/parallel conversion unit 124 serial/parallel converts the data signal DT2 and outputs a parallel data signal DTS1-2. The first frequency dividing unit 125 frequency-divides the clock signal CLK1-1 and outputs a frequency-divided clock signal CLK2-1. The second frequency dividing unit 126 frequency-divides the clock signal CLK1-2 and outputs a frequency-divided clock signal CLK2-2.

In the present comparative example, the first serial/parallel conversion unit 123 and the second serial/parallel conversion unit 124 perform serial/parallel conversion at a conversion ratio of 1:16. The first frequency dividing unit 125 and the second frequency dividing unit 126 frequency-divide the input clock signal into 16. For example, when the input data signal is 10 Gbps and the clock signal is 10 GHz, 625 Mbps× 16 parallel data signals and a frequency-divided clock signal of 625 MHz are output.

The parallel data signal DTS1-1 and the frequency-divided clock signal CLK2-1 are input to the first synchronization pattern detecting unit 127. When the first synchronization pattern detecting unit 127 detects a predetermined frame synchronization pattern from the parallel data signals DTS1-1, the first synchronization pattern detecting unit 127 outputs a synchronizing pulse. The first synchronization pattern detecting unit 127 detects a delay bit number and outputs the delay bit number to the first variable shift register 129. The "delay bit number" is information showing that the frame synchronization pattern is stored at a position shifted by how many bits from the first bit of the parallel data signal.

The parallel data signal DTS1-2 and the frequency-divided clock signal CLK2-2 are input to the second synchronization pattern detecting unit 128. When the second synchronization pattern detecting unit 128 detects a predetermined frame synchronization pattern from the parallel data signal DTS1-2, the second synchronization pattern detecting unit 128 outputs the synchronizing pulse. In addition, the second synchronization pattern detecting unit 128 detects the delay bit number and outputs the delay bit number to the second variable shift register 130.

The first variable shift register 129 receives the parallel data signal DTS1-1, the frequency-divided clock signal CLK2-1, the delay bit number information, and the synchronizing pulse. The first variable shift register 129 refers to the delay bit number information and rearranges the parallel data signal DTS1-1 so that the first bit of the header is the first bit of the parallel data.

The second variable shift register 130 receives the parallel data signal DTS1-2, the frequency-divided clock signal CLK2-2, the delay bit number information, and the synchronizing pulse. The second variable shift register 130 refers to the delay bit number information and rearranges the parallel data signal DTS1-2 so that the first bit of the header is the first bit of the parallel data.

The parallel data signal DTS2-1 rearranged by the first variable shift register 129 and the parallel data signal DTS2-2 rearranged by the second variable shift register 130 are input to the clock transfer unit 131. Further, a local clock signal CLK3 output from the local oscillator 135 is input to the clock transfer unit 131. The local clock signal CLK3 is a clock signal with the same frequency as the frequency-divided clock signal.

The clock transfer unit 131 transfers the parallel data signal DTS2-1 synchronized with the frequency-divided clock signal CLK2-1 to the local clock signal CLK3. The parallel data signal DTS2-1 after the clock transfer is referred to as a parallel data signal DTS3-1. The clock transfer unit 131 further transfers the parallel data signal DTS2-2 synchronized with the frequency-divided clock signal CLK2-2 to the local clock signal CLK3. The parallel data signal DTS2-2 after the clock transfer is referred to as a parallel data signal DTS3-2. The clock transfer unit 131 can be constituted using a FIFO (First-In First-Out) circuit and so on.

The parallel data signal DTS3-1 is input to the first header analysis unit 132. The first header analysis unit 132 analyzes the header of the parallel data signal DTS3-1 using the local clock signal CLK3 as an operation clock and extracts the packet length and the route information. The parallel data signal DTS3-2 is input to the second header analysis unit 133. The second header analysis unit 133 analyzes the header of the parallel data signal DTS3-2 using the local clock signal CLK3 as an operation clock and extracts the packet length and the route information.

The output competition determining unit 134 operates by using the local clock signal CLK3 as the operation clock. The output competition determining unit 134 generates an optical switch control signal based on the header analysis result in the first header analysis unit 132 and the second header analysis unit 133. Then, the output competition determining unit 134 determines whether the generated optical switch control signals overlap temporally, thereby determining passing/discarding of the optical packet signal. Then, the output competition determining unit 134 outputs the optical switch control signal to the optical switch section 116 in order to switch the route of the optical packet signal determined to be passed.

For example, there will be considered a case in which the first input unit 117 and the second input unit 118 receive the optical packet signals at substantially the same time, and the output destinations of the two optical packet signals are the first output unit 136. In this case, the output competition determining unit 134 generates the optical switch control signals to the two optical packet signals and determines whether the optical switch control signals overlap temporally. When the optical switch control signals overlap temporally, the output competition determining unit 134 determines that the optical packet signal arrived first is passed and the subsequent optical packet signal is discarded.

As described above, the other optical packet signal branched by the first optical coupler 111 passes through the first optical delay line 114 and then are input to a first input port 116a of the optical switch section 116. The other optical packet signal branched by the second optical coupler 112 passes through the second optical delay line 115 and then are input to a second input port 116b of the optical switch section 116. The first optical delay line 114 and the second optical delay line 115 delay the optical packet signal by the time required for the optical switch control section 113 to generate the optical switch control signal. By virtue of the provision of the first optical delay line 114 and the second optical delay line 115, on/off of the optical switch section 116 can be controlled with the same timing as the arrival of the optical packet signal at the optical switch section 116. The delay time of the optical delay line can be adjusted by changing the optical fiber length.

The on/off of the optical switch section 116 is controlled by the optical switch control signal from the output competition determining unit 134 and switches the route of the input optical packet signal to output the input optical packet signal. As shown in FIG. 1, the optical switch section 116 includes third to sixth optical couplers 138 to 141 and first to fourth optical gate switches 142 to 145. As an optical gate switch, a semiconductor optical amplifier (SOA) can be used, for example.

The optical switch section 116 is a 2×2 optical switch. The first input port 116a of the optical switch section 116 is connected to the first optical delay line 114, and the second input port 116b is connected to the fourth optical coupler 139. A first output port 116c of the optical switch section 116 is connected to the first output unit 136, and a second output port 116d is connected to the second output unit 137.

As shown in FIG. 1, the third optical coupler 138 is connected to the first input port 116a, the fourth optical coupler 139 is connected to the second input port 116b, the fifth optical coupler 140 is connected to the first output port 116c, and the sixth optical coupler 141 is connected to the second output port 116d. The first optical gate switch 142 is provided between the third optical coupler 138 and the fifth optical coupler 140, the second optical gate switch 143 is provided between the third optical coupler 138 and the sixth optical coupler 141, the third optical gate switch 144 is provided between the fourth optical coupler 139 and the fifth optical coupler 140, and the fourth optical gate switch 145 is provided between the fourth optical coupler 139 and the sixth optical coupler 141. The optical switch control signal from the output competition determining unit 134 is input to each optical gate switch.

For example, when the optical packet signal input to the first input port 116a is output to the second output port 116d, the first optical gate switch 142 is in an off state (closed state), and the second optical gate switch 143 is in an on state (open state), whereby the optical packet signal passes through only the second optical gate switch 143 and is then output from the second output port 116d.

Figure 3:
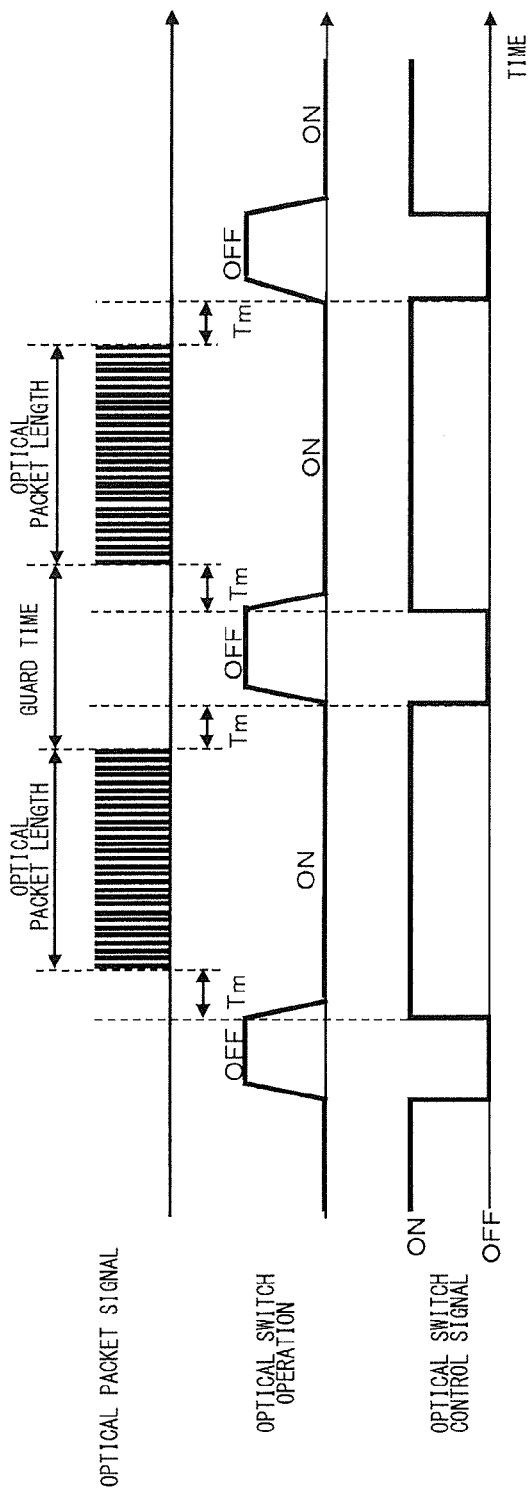
FIG. 3 is a view showing an operation timing chart of an optical packet switch device.

FIG. 3 shows an operation timing chart of the optical packet switch device. FIG. 3 is a timing chart of an optical packet signal, operation of an optical switch, and an optical switch control signal. Although the optical switch is in an off state when the optical packet signal is not input, the optical switch is turned on with the same timing as the arrival of the optical packet signal at the optical switch. As shown in FIG. 3, the optical switch is in the on state for a longer time than the actual optical packet length. This is because, as described later, the timing of outputting the optical switch control signal is varied by a phase relationship between the received optical packet signal and an operation clock signal inside the optical switch control section 113. The extra time of keeping the on state of the optical switch obtained by subtracting the optical packet length from the time when the optical switch is in the on state is referred to as a "timing margin Tm".

The transition time between on/off of the optical switch is later than the clock signal extracted from the optical packet signal. Since a single optical packet signal is constituted of 100 bits to several hundred thousand bits, the time of keeping the on state of the optical switch is increased by the same amount. For these reasons, the operating frequency of the optical switch is slower than the clock signal extracted from the optical packet signal. Accordingly, it is preferable in terms of circuit size and lower power consumption to control the optical switch using, as the operation clock, a frequency-divided clock signal slower than the clock signal extracted from the optical packet signal.

While the optical packet signal has a changing point at the speed of the extracted clock signal, the optical switch control signal has a changing point at the speed of a low-speed clock corresponding to a frequency-divided clock signal. In the switching of the optical switch, when the first bit of the received optical packet passes, the optical switch can be in the on state, and when the last bit passes, the optical switch can be in the off state, whereby the resource of the switch can be most effectively utilized; however, the number of the changing points is reduced, so that the resolution of the time that can be set as the operation of the optical switch is rough. Therefore, the optical switch is required to keep turned on for a longer time than the actual optical packet presence time, so that the guard time is required to be increased.

Figure 4B:
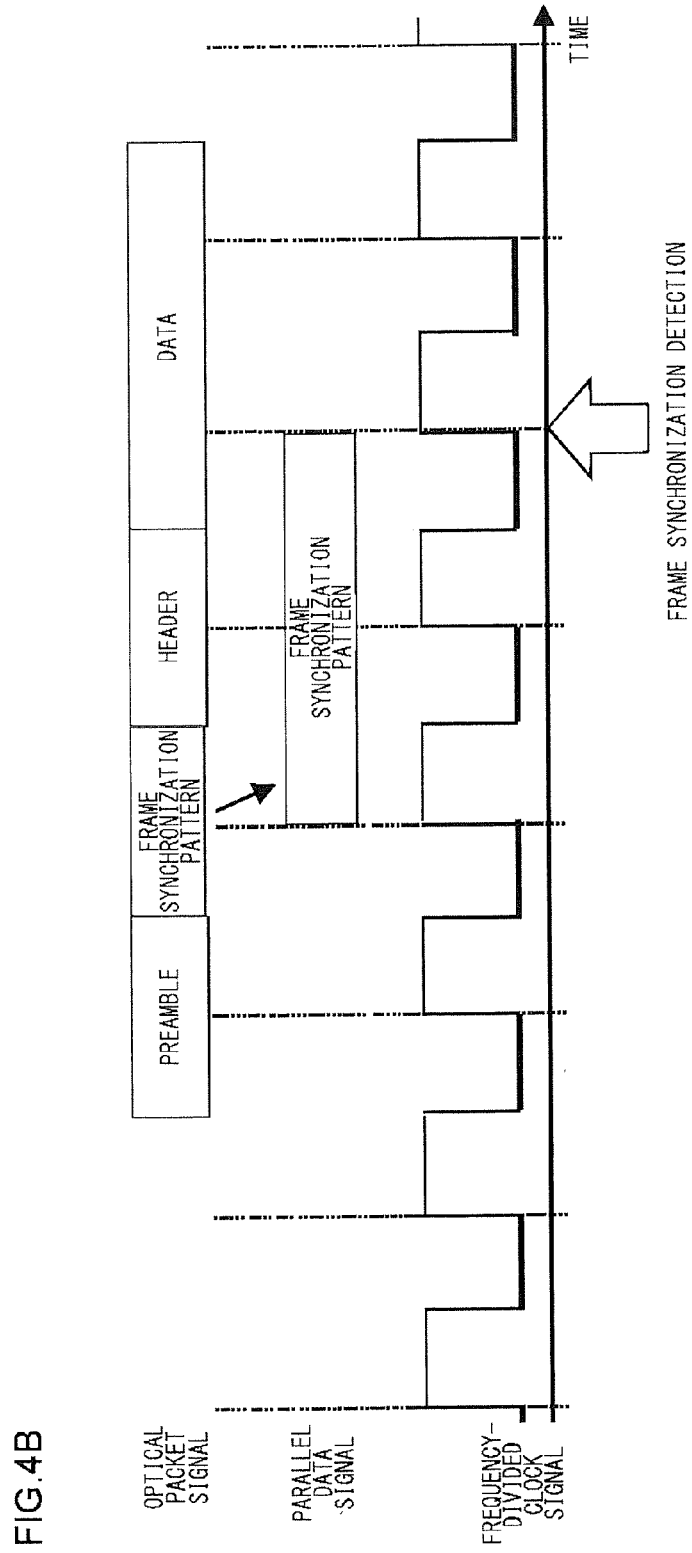

FIGS. 4A and 4B are views for explaining a variation of a frame synchronization detection timing. FIG. 4A shows an example of a phase relationship between the optical packet signal and the frequency-divided clock signal. FIG. 4B shows another example of the phase relationship between the optical packet signal and the frequency-divided clock signal.

As described above, the first synchronization pattern detecting unit 127 and the second synchronization pattern detecting unit 128 detect a predetermined frame synchronization pattern from the parallel data signal to thereby establish frame synchronization of the optical packet signal. The phase relationship between the optical packet signal and the frequency-divided clock signal is indefinite, and therefore, when a serial data signal is serial/parallel converted, the arrangement of the frame synchronization pattern included in the parallel data signal is uncertain. Namely, there occur the case as shown in FIG. 4A where the frame synchronization pattern of the parallel data signal is arranged in the same phase and the case as shown in FIG. 4B where the frame synchronization pattern of the parallel data signal is arranged crossing over two clocks of the frequency-divided clock signal. In the first synchronization pattern detecting unit 127 and the second synchronization pattern detecting unit 128, the frame synchronizing pulse is output when all the frame synchronization patterns are detected, and therefore, in the case of FIG. 4A and the case of FIG. 4B, the timing of detection of the frame synchronization is varied by one clock of the frequency-divided clock signal. The variation of the timing of the detection of the frame synchronization causes variation of the output timing of the optical switch control signal.

FIGS. 5A and 5B are views for explaining a variation of a clock transfer timing. Since the optical packet signals from a large number of optical packet generation stations arrive at the optical packet switch device, the clocks of the optical packet signals are asynchronous. If the optical packet signals are emitted from the same optical packet generation station, when the routes through which the optical packet signals are passed before arriving at the optical packet switch device are different, the optical fiber transmission delay time is also different, so that the phase difference occurs. Accordingly, it should be considered that all the optical packet signals are asynchronous. When the optical packet signals toward a single output port arrive at two input ports simultaneously, such an arbitration processing is required that any one of the optical packet signals is passed, and the other is discarded. Since the optical packet signals to be arbitrated are asynchronous with each other, two optical packet signals are required to be transferred to the same local clock signal in order to perform the arbitration processing in an electrical control circuit.

The clock signal extracted from the optical packet signal has a stable period and a duty ratio during reception of the optical packet; however, since the clock extraction cannot be performed when the optical packet is not received, the period and the duty ratio become unstable. In an electrical circuit, since the setup/hold characteristics can be guaranteed by a stable clock, it is reasonable to provide a local oscillator to transfer the data signal to the local clock signal, and, thus, to perform the arbitration processing between the optical packets. Even if the local clock signal is not used, the optical packets are asynchronous with each other, and therefore, the clock transfer processing is required.

FIG. 5A shows a case where the phase difference between the frequency-divided clock signal and the local clock signal is small. FIG. 5B shows a case where the phase difference between the frequency-divided clock signal and the local clock signal is large. The clock transfer unit 131 transfers the clock on the rising edges of the local clock signal. However, as shown in FIGS. 5A and 5B, the clock transfer timing varies according to the phase difference between the frequency-divided clock signal and the local clock signal. The timing variation corresponds to up to one clock of the frequency-divided clock signal. The variation of the clock transfer timing causes a variation of the output timing of the optical switch control signal.

As described in FIGS. 4A, 4B, 5A, and 5B, the timing of outputting the optical switch control signal may vary by one clock of the frequency-divided clock signal due to the frame synchronization detection and may vary by one clock of the frequency-divided clock signal due to the clock transfer. In order to allow the variation by those total two clocks, the timing margin Tm is provided before and after the optical packet signal, and the optical switch should continue to be turned on for a longer time than an actual optical packet length. However, if the time for the optical switch being turned on is long, the guard time between the optical packet signals becomes long, and therefore, the band utilization efficiency of a transmission line is reduced.

Figure 6:
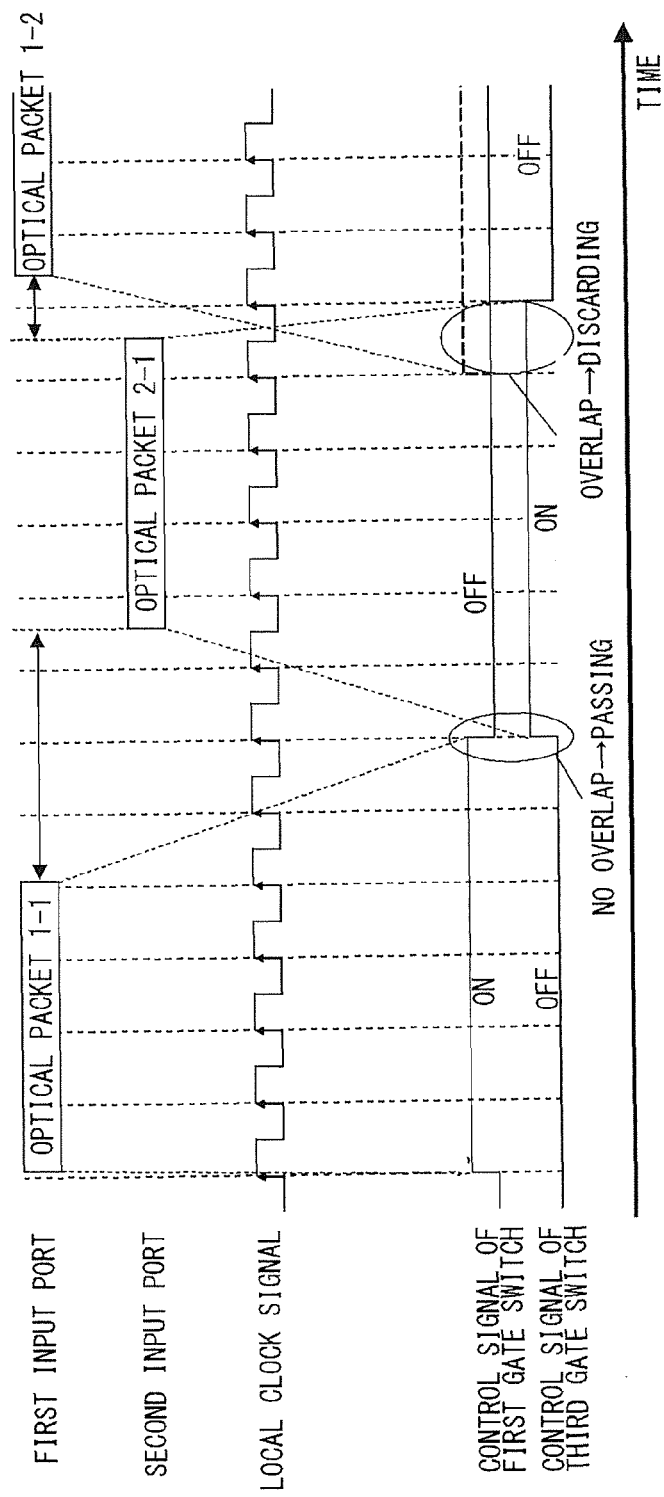
FIG. 6 is a view for explaining determination of passing/discarding of the optical packet signal.

FIG. 6 is a view for explaining determination of passing/discarding of the optical packet signal. There will be considered a case where the optical packet signals are continuously input to the first input port 116a and the second input port 116b of the optical switch section 116 and joined toward the first output port 116c. When the optical packet signals compete against each other, the first arrival optical packet signal is given preference. Thus, the first arrival packet is passed, and the subsequent packet is discarded. At that time, whether the subsequent packet is discarded is required to be determined.

As shown in FIG. 6, there will be considered a case where an optical packet 1-1 is input to the first input port 116a, and then an optical packet 2-1 is input to the second input port 116b. In this case, whether the optical packet 2-1 is passed is required to be determined. The output competition determining unit 134 first determines whether the optical switch control signal that turns on the first optical gate switch 142 and the optical switch control signal that turns on the third optical gate switch 144 overlap temporally. At this point, the optical switch control signal is not output to the third optical gate switch 144 yet. In this case, as shown in FIG. 6, the optical switch control signal of the first optical gate switch 142 and the optical switch control signal of the third optical gate switch 144 do not overlap temporally. Accordingly, the output competition determining unit 134 determines to pass the optical packet 2-1 and outputs the optical switch control signal to the third optical gate switch 144.

Next, as shown in FIG. 6, there will be considered a case where the optical packet 1-2 is input to the first input port 116a after the input of the optical packet 2-1. Also in this case, whether the optical packet 1-2 is passed is required to be determined. The output competition determining unit 134 first determines whether the optical switch control signal that turns on the third optical gate switch 144 and the optical switch control signal (shown by the dashed line) that turns on the first optical gate switch 142 overlap temporally. At this point, the optical switch control signal is not output to the first optical gate switch 142 yet. In this case, as shown in FIG. 6, the optical switch control signal of the third optical gate switch 144 and the optical switch control signal of the first optical gate switch 142 overlap temporally. Accordingly, the output competition determining unit 134 determines to discard the optical packet 1-2 and does not output the control signal that turns on the first optical gate switch 142.

As described above, since the timing margin Tm is provided before and after the optical packet signal, where the optical packet signal is present during the time when the optical switch is turned on is not grasped. That is, if the optical switch control signals overlap, the optical packet signals may overlap each other. Thus, in the optical packet switch device 110 according to the comparative example, when the optical switch control signals overlap, the subsequent optical packet signal is discarded to prevent the impact between the two optical packet signals.

However, in the above passing/discarding determination method, although the optical packet 2-1 and the optical packet 1-2 do not actually overlap, the optical switch control signals overlap, and therefore, the optical packet 1-2 is discarded. Accordingly, the optical packet switch device 110 according to the comparative example has a room for improvement in the packet loss rate.

The present inventors focus attention on the above problems, and as a result of intensive studies, the present invention has been devised. Hereinafter, the optical packet switch device according to an embodiment of the present invention will be described.

Figure 7:
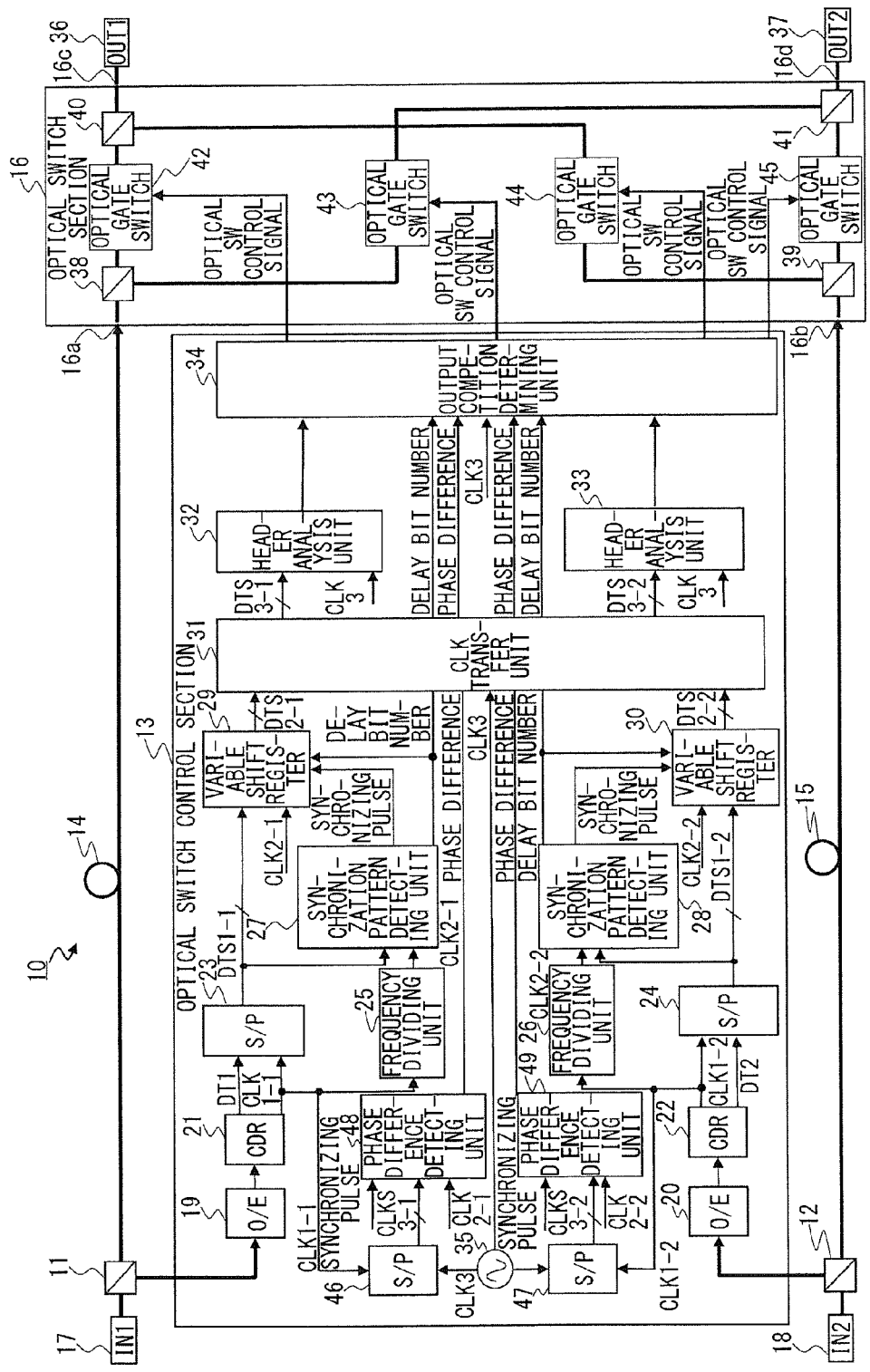
FIG. 7 is a view for explaining an optical packet switch device according to an embodiment of the present invention.

FIG. 7 is a view for explaining an optical packet switch device 10 according to an embodiment of the present invention. The optical packet switch device 10 is a two-input by two-output switch device. As shown in FIG. 7, the optical packet switch device 10 includes a first optical coupler 11, a second optical coupler 12, an optical switch control section 13, a first optical delay line 14, a second optical delay line 15, an optical switch section 16, a first input unit 17, a second input unit 18, a first output unit 36, and a second output unit 37.

The optical packet signal input to the first input unit 17 via an optical transmission line is branched into two optical packet signals by the first optical coupler 11. One of the branched optical packet signals is input to the optical switch control section 13, and the other optical packet signal is input to the optical switch section 16 via the first optical delay line 14. The optical packet signal input to the second input unit 18 via another optical transmission line is branched into two optical packet signals by the second optical coupler 12. One of the branched optical packet signals is input to the optical switch control section 13, and the other optical packet signal is input to the optical switch section 16 via the second optical delay line 15. The optical packet signal may have a bit rate of 10.3 Gb/s and a packet length of 64 to 1500 bytes, for example. In this case, the packet duration is approximately 50 to 1200 ns.

The optical switch control section 13 extracts the route information from the optical packet signal and outputs a control signal to the optical switch section 16 according to the route information. As shown in FIG. 7, the optical switch control section 13 includes a first optical/electrical conversion unit 19, a second optical/electrical conversion unit 20, a first CDR unit 21, a second CDR unit 22, a first serial/parallel conversion unit 23, a second serial/parallel conversion unit 24, a third serial/parallel conversion unit 46, a fourth serial/parallel conversion unit 47, a first phase difference detecting unit 48, a second phase difference detecting unit 49, a first frequency dividing unit 25, a second frequency dividing unit 26, a first synchronization pattern detecting unit 27, a second synchronization pattern detecting unit 28, a first variable shift register 29, a second variable shift register 30, a clock transfer unit 31, a local oscillator 35, a first header analysis unit 32, a second header analysis unit 33, and an output competition determining unit 34.

The first optical/electrical conversion unit 19 converts the optical packet signal received from the first optical coupler 11 into an electrical signal. Meanwhile, the second optical/electrical conversion unit 20 converts the optical packet signal received from the second optical coupler 12 into an electrical signal.

The first CDR unit 21 receives the electrical signal from the first optical/electrical conversion unit 19 and separates the electrical signal into a data signal DT1 and a clock signal CLK1-1. The second CDR unit 22 receives the electrical signal from the second optical/electrical conversion unit 20 and separates the electrical signal into a data signal DT2 and a clock signal CLK1-2.

The first serial/parallel conversion unit 23 serial/parallel converts the data signal DT1 and outputs a parallel data signal DTS1-1. The second serial/parallel conversion unit 24 serial/parallel converts the data signal DT2 and outputs a parallel data signal DTS1-2. The first frequency dividing unit 25 frequency-divides the clock signal CLK1-1 and outputs a frequency-divided clock signal CLK2-1. The second frequency dividing unit 26 frequency-divides the clock signal CLK1-2 and outputs a frequency-divided clock signal CLK2-2.

In the present embodiment, the first serial/parallel conversion unit 23 and the second serial/parallel conversion unit 24 perform serial/parallel conversion at a conversion ratio of 1:16. The first frequency dividing unit 25 and the second frequency dividing unit 26 frequency-divide the input clock signal into 16. For example, when the input optical packet signal has a bit rate of 10.3 Gb/s, the frequency-divided clock signal is 644 MHz. Accordingly, while 1 bit time of the optical packet signal is 0.1 ns, 1 clock time of an FPGA internal signal is 1.6 ns. The processing from detection of the synchronization pattern to generation of the optical switch control signal is performed in the FPGA.

The parallel data signal DTS1-1 and the frequency-divided clock signal CLK2-1 are input to the first synchronization pattern detecting unit 27. When the first synchronization pattern detecting unit 27 detects a predetermined frame synchronization pattern from the parallel data signal DTS1-1, the first synchronization pattern detecting unit 27 outputs a synchronizing pulse. The first synchronization pattern detecting unit 27 detects the delay bit number and outputs the delay bit number to the first variable shift register 29.

The parallel data signal DTS1-2 and the frequency-divided clock signal CLK2-2 are input to the second synchronization pattern detecting unit 28. When the second synchronization pattern detecting unit 28 detects a predetermined frame synchronization pattern from the parallel data signal DTS1-2, the second synchronization pattern detecting unit 28 outputs the synchronizing pulse. In addition, the second synchronization pattern detecting unit 28 detects the delay bit number and outputs the delay bit number to the second variable shift register 30.

The first variable shift register 29 receives the parallel data signal DTS1-1, the frequency-divided clock signal CLK2-1, the delay bit number information, and the synchronizing pulse. The first variable shift register 29 refers to the delay bit number information and rearranges the parallel data signal DTS1-1 so that the first bit of the header is the first bit of the parallel data.

The second variable shift register 30 receives the parallel data signal DTS1-2, the frequency-divided clock signal CLK2-2, the delay bit number information, and the synchronizing pulse. The second variable shift register 30 refers to the delay bit number information and rearranges the parallel data signal DTS1-2 so that the first bit of the header is the first bit of the parallel data.

The local oscillator 35 outputs a local clock signal CLK3. The local clock signal CLK3 is a clock signal with the same frequency as the frequency-divided clock signal.

The third serial/parallel conversion unit 46 receives the local clock signal CLK3 and the clock signal CLK1-1. The third serial/parallel conversion unit 46 performs serial/parallel conversion at a conversion ratio of 1:16 with respect to the local clock signal CLK3, using the clock signal CLK1-1. Namely, the local clock signal as a low-speed clock corresponding to a frequency-divided clock is hit by the high-speed clock signal CLK1-1 to serial/parallel convert the local clock signal. The parallel signal output from the third serial/parallel conversion unit 46 is referred to as a "parallel local clock signal CLKS3-1".

The fourth serial/parallel conversion unit 47 receives the local clock signal CLK3 and the clock signal CLK1-2. The fourth serial/parallel conversion unit 47 performs serial/parallel conversion at a conversion ratio of 1:16 with respect to the local clock signal CLK3, using the clock signal CLK1-2. The local clock signal CLK3 is serial/parallel converted by the clock signal CLK1-2. The parallel signal output from the fourth serial/parallel conversion unit 47 is referred to as a "parallel local clock signal CLKS3-2".

The first phase difference detecting unit 48 receives the parallel local clock signal CLKS3-1, the frequency-divided clock signal CLK2-1, and the synchronizing pulse. The first phase difference detecting unit 48 refers to the parallel local clock signal CLKS3-1 to thereby detect the phase difference between the local clock signal CLK3 and the frequency-divided clock signal CLK2-1.

The second phase difference detecting unit 49 receives the parallel local clock signal CLKS3-2, the frequency-divided clock signal CLK2-2, and the synchronizing pulse. The second phase difference detecting unit 49 refers with the parallel local clock signal CLKS3-1 to thereby detect the phase difference between the local clock signal CLK3 and the frequency-divided clock signal CLK2-2.

The clock transfer unit 31 receives the parallel data signal DTS2-1 rearranged by the first variable shift register 29, the parallel data signal DTS2-2 rearranged by the second variable shift register 30, and the local clock signal CLK3.

The clock transfer unit 31 transfers the parallel data signal DTS2-1 synchronized with the frequency-divided clock signal CLK2-1 to the local clock signal CLK3. The parallel data signal DTS2-1 after the clock transfer is referred to as a "parallel data signal DTS3-1". The clock transfer unit 31 further transfers the parallel data signal DTS2-2 synchronized with the frequency-divided clock signal CLK2-2 to the local clock signal CLK3. The parallel data signal DTS2-2 after the clock transfer is referred to as a "parallel data signal DTS3-2".

The parallel data signal DTS3-1 is input to the first header analysis unit 32. The first header analysis unit 32 analyzes the header of the parallel data signal DTS3-1 using the local clock signal CLK3 as an operation clock and extracts the packet length and the route information. The parallel data signal DTS3-2 is input to the second header analysis unit 33. The second header analysis unit 33 analyzes the header of the parallel data signal DTS3-2 using the local clock signal CLK3 as an operation clock and extracts the packet length and the route information.

The output competition determining unit 34 receives the header analysis result from the first header analysis unit 32 and the second header analysis unit 33, the delay bit number information from the first synchronization pattern detecting unit 27 and the second synchronization pattern detecting unit 28, and the phase difference information from the first phase difference detecting unit 48 and the second phase difference detecting unit 49. The output competition determining unit 34 determines passing/discarding of the optical packet signal based on the information. Then, the output competition determining unit 34 generates the optical switch control signal based on the determination result and outputs the optical switch control signal to the optical switch section 16. The output competition determining unit 34 operates by using the local clock signal CLK3 as the operation clock. The operation of the output competition determining unit 34 will be described later.

The on/off of the optical switch section 16 is controlled by the optical switch control signal from the output competition determining unit 34 and switches the route of the input optical packet signal to output the input optical packet signal. As shown in FIG. 7, the optical switch section 16 includes third to sixth optical couplers 38 to 41 and first to fourth optical gate switches 42 to 45. Since the constitution of the optical switch section 16 is similar to that of the optical switch section 116 shown in FIG. 1, the detailed description will not be repeated.

FIGS. 8A-1 and 8A-2 to 8G-1 and 8G-2 are views for explaining a frame synchronization pattern detection processing and a parallel data signal rearrangement processing. Since the operation of the first synchronization pattern detecting unit 27 is similar to the operation of the second synchronization pattern detecting unit 28, the first synchronization pattern detecting unit 27 will be described as an example.

FIGS. 8A-1 and 8A-2 shows the optical packet signal. FIGS. 8B-1 and 8B-2 shows a clock signal CLK1-1 extracted from the optical packet signal. FIGS. 8C-1 and 8C-2 shows the frequency-divided clock signal CLK2-1 obtained by frequency-dividing the clock signal CLK1-1 into 16. FIGS. 8D-1 and 8D-2 shows the parallel data signal DTS1-1 serial/parallel converted by the first serial/parallel conversion unit 23. FIGS. 8E-1 and 8E-2 shows the synchronizing pulse output from the first synchronization pattern detecting unit 27. FIGS. 8F-1 and 8F-2 shows the delay bit number detected in the first synchronization pattern detecting unit 27. FIGS. 8G-1 and 8G-2 shows the parallel data signal DTS2-1 rearranged by the first variable shift register 29.

As shown in FIGS. 8B-1 and 8B-2, although the clock signal CLK1-1 is stably extracted at the time period when the optical packet signal is present, both the frequency and the phase are in a free-running state at the time period when the optical packet signal is not present. The low-speed frequency-divided clock signal CLK2-1 is generated by frequency-dividing the clock signal CLK1-1, and therefore, although the frequency-divided clock signal CLK2-1 is synchronized with the clock signal CLK1-1 at the time period when the optical packet signal is present, the frequency-divided clock signal CLK2-2 is in a free-running state where the frequency and the phase are unstable at the time period when the optical packet signal is not present. When the frequency-divided clock signal CLK2-2 is in the free-running state, if the optical packet signal arrives, the frequency-divided clock signal CLK2-1 is synchronized with the clock signal CLK1-1 extracted from the optical packet signal. However, since the phase relation-ship between the free-running frequency-divided clock signal CLK 2-1 and the arrived optical packet signal is unstable, in the serial/parallel converted parallel data signal DTS1-1, the arrangement of the frame synchronization pattern is uncertain. FIGS. 8D-1 and 8D-2 illustrates an example of the arrangement of the frame synchronization pattern.

When the first serial/parallel conversion unit 23 performs the serial/parallel conversion, the first serial/parallel conversion unit 23 outputs data on the serial side at once to the parallel side at the time when the data on the serial side is arranged by the bit number on the parallel side (16 bits in the present embodiment). Then, the first synchronization pattern detecting unit 27 searches the frame synchronization pattern from the parallel data signal DTS1-1. At that time, the first synchronization pattern detecting unit 27 detects that the frame synchronization pattern is stored at a position shifted by how many bits from the first bit (B0) of the parallel data. As shown in FIGS. 8D-1 and 8D-2, in this case, the frame synchronization pattern is stored at a position shifted by three bits from the first bit of the parallel data. As described above, the bit shift amount is referred to as the "delay bit number". In the present embodiment, the delay bit number is 3. This value is determined by the timing of input of the optical packet signal to the frequency-divided clock signal CLK2-1 and becomes a random value for each optical packet signal. Conversely, if the delay bit number information can be known, the temporal position relationship of the optical packet signal to the frequency-divided clock signal CLK2-1 can be read.

The first variable shift register 29 rearranges the parallel data signal DTS1-1 with reference to the delay bit number detected by the first synchronization pattern detecting unit 27. In this case, since the delay bit number is 3, the first variable shift register 29 shifts the parallel data signal DTS1-1 by three bits, whereby, as shown in FIGS. 8G-1 and 8G-2, the parallel data signal can be rearranged so that the first bit of the header is the first bit of the parallel data.

FIGS. 9A-1 and 9A-2 to 9H-1 and 9H-2 are views for explaining the operation of the phase difference detecting unit. Since the operation of the first phase difference detecting unit 48 is similar to the operation of the second phase difference detecting unit 49, the first phase difference detecting unit 48 will be described as an example.

FIGS. 9A-1 and 9A-2 shows the optical packet signal. FIGS. 9B-1 and 9B-2 shows the clock signal CLK1-1 extracted from the optical packet signal. FIGS. 9C-1 and 9C-2 shows the frequency-divided clock signal CLK2-1 obtained by frequency-dividing the clock signal CLK1-1 into 16. FIGS. 9D-1 and 9D-2 shows the parallel data signal DTS1-1 serial/parallel converted by the first serial/parallel conversion unit 23. FIGS. 9D-1 and 9D-2 shows the synchronizing pulse output from the first synchronization pattern detecting unit 27 when the frame synchronization pattern is detected. FIGS. 9E-1 and 9E-2 shows the local clock signal CLK3 output from the local oscillator 35. FIGS. 9F-1 and 9F-2 shows the parallel local clock signal CLKS3-1 obtained by serial/parallel converting the local clock signal CLK3 by the clock signal CLK1-1. FIGS. 9G-1 and 9G-2 shows the phase difference information detected by the first phase difference detecting unit 48. FIGS. 9F-1 and 9F-2 shows the parallel data signal DTS3-1 of which clock is transferred by the clock transfer unit 31.

As described above, when arbitration is performed between a plurality of packets, a clock is required to be synchronized. Thus, a stable local oscillator is used, and it is preferable to synchronize an asynchronous optical packet signal with a local clock signal. At that time, the phase difference between the local clock signal CLK3 and the frequency-divided clock signal CLK2-1 becomes delay difference generated by the clock transfer. In this case, the local clock signal CLK3 as a low-speed clock corresponding to the frequency-divided clock signal CLK2-1 is hit by the high-speed clock signal CLK1-1 and serial/parallel converted, whereby the delay difference due to the clock transfer is detected.

When the local clock signal CLK3 shown in FIGS. 9E-1 and 9E-2 is serial/parallel converted by the clock signal CLK1-1 shown in FIGS. 9B-1 and 9B-2, a parallel local clock signal CLKS3 in which a series of "1 (high)" and a series of "0 (low)" are arranged alternately is obtained as shown in FIGS. 9F-1 and 9F-2. The first phase difference detecting unit 48 counts the number of "0" arranged in the same phase. The number of "0" represents that by how many clocks of the clock signal CLK1-1 the local clock signal CLK3 is delayed with respect to the frequency-divided clock signal CLK2-1. In FIGS. 9F-1 and 9F-2, since seven "0" are continued, the first phase difference detecting unit 48 can detect that the local clock signal CLK3 is delayed by seven clocks of the clock signal CLK1-1 with respect to the frequency-divided clock signal CLK2-1.

As described in FIGS. 8A-1 to 8G-1 and 8A-2 to 8G-2, the frequency-divided clock signal CLK2-1 is delayed by three clocks of the clock signal CLK1-1 with respect to the optical packet signal. Further, as described in FIGS. 9A-1 to 9G-1 and 9A-2 to 9A-2, the local clock signal CLK3 is delayed by seven clocks of the clock signal CLK1-1 with respect to the frequency-divided clock signal CLK2-1. Accordingly, when those delay amounts are summed, the parallel data signal DTS3-1 of which clock is transferred is delayed by ten clocks of the clock signal CLK1-1 with respect to the optical packet signal, as shown in FIGS. 9H-1 and 9H-2. In the optical packet switch device 10 according to the present embodiment, the generation of the optical packet control signal and the determination of passing/discarding of the optical packet control signal are performed with reference to the total delay amount.

FIG. 10 is a view for explaining the operation of the optical packet switch device 10 according to the present embodiment. There will be described an optical switch control signal generation processing and a optical packet signal passing/discarding determination processing using the delay bit number information detected by the synchronization pattern detecting unit and the phase difference information detected by the phase difference detecting unit.

In FIG. 10, as in FIG. 6, there will be considered a case where the optical packet signals are continuously input to a first input port 16a and a second input port 16b of the optical switch section 16 and joined toward a first output port 16c. As shown in FIG. 10, first, an optical packet 1-1 is input to the first input port 16a, and then an optical packet 2-1 is input to the second input port 16b. Subsequently, an optical packet 1-2 is input to the first output port 16c. As described in FIGS. 9H-1 and 9H-2, the parallel data signal DTS3-1 is output to be delayed by the total delay amount as viewed from the viewpoint of the optical packet signal.

As in the comparative example, the optical switch control signal is changed only at a changing point (rising edge) of the local clock signal CLK3. In the optical packet switch device according to the comparative example, since a temporal relationship between the optical packet signal and the optical switch control signal is not known, the optical switch is required to be opened for a longer period of time corresponding to the maximum variation (two clocks of the frequency-divided clock signal) of the optical switch control signal. Meanwhile, in the optical packet switch device 10 according to the present embodiment, by virtue of the total delay amount obtained by summing the delay amounts detected by the synchronization pattern detecting unit and the phase difference detecting unit, the start timing and the end timing of the optical packet signal can be calculated for the time of not more than one clock of the local clock signal CLK3.

First, the generation of the optical switch control signal will be described. When the optical switch control signal is switched from on to off, from the position where the frame synchronization is detected back by the total delay amount, the optical switch control signal is turned on, on the rising edge of the local clock signal CLK3 after being passed.

When the optical switch control signal is switched from on to off, after a lapse of time, corresponding to the optical packet length (extracted from the header of the optical packet signal), from the turning-on of the optical switch control signal, the optical switch control signal is turned off on the rising edge of the first local clock signal CLK3. The optical switch control signal is generated thus, whereby the optical switch can be turned on only during the necessary shortest time.

Next, the determination of passing/discarding of the optical packet signal will be described. In the present embodiment, the output competition determining unit 34 determines passing/discarding of the optical packet signals competing with each other based on the total delay amount described above. As described above, in the present embodiment, the start timing and the end timing of the optical packet signal can be calculated for the time of not more than one clock of the local clock signal CLK3 by the total delay amount obtained by summing the delay amounts detected by the synchronization pattern detecting unit and the phase difference detecting unit. Thus, the interval between the optical packet signals is calculated from the total delay amount of the before and after optical packet signals with respect to the local clock signal CLK3. When the interval between the optical packet signals is plus, that is, the optical packet signals do not overlap, it is regarded that the optical packets do not impact each other, and the subsequent optical packet is passed. Meanwhile, when the interval between the optical packet signals is minus, that is, the optical packets overlap each other, it is determined to discard the subsequent optical packet.

The above will be specifically described with reference to FIG. 10. The interval between the optical packet signals is a value obtained by subtracting a total delay amount SD2 with respect to the rising edge of the local clock signal CLK3 of the subsequent optical packet 2-1 from a total delay amount SD1 with respect to the rising edge of the local clock signal CLK3 of the preceding optical packet 1-1. When the calculated interval between the optical packet signals is a plus value, the optical packet 1-1 and the optical packet 2-1 do not overlap temporally, and therefore, the subsequent optical packet 2-1 is passed. Meanwhile, when the calculated interval between the optical packet signals is a minus value, the optical packet 1-1 and the optical packet 2-1 overlap temporally, and therefore, the subsequent optical packet 2-1 is discarded.

In the optical packet 1-1 and the optical packet 2-1, since the optical switch control signals overlap each other, in the optical packet switch device 110 according to the comparative example the subsequent optical packet 2-1 is discarded. However, according to the optical packet switch device 10 according to the present embodiment, since whether the optical packets actually overlap each other can be determined, it can be determined to pass the optical packet without discarding the optical packet. Consequently, the packet loss rate can be improved. Meanwhile, like the optical packet 2-1 and the optical packet 1-2, when the optical packets actually overlap each other, the subsequent optical packet 1-2 is discarded. By virtue of the use of the passing/discarding determination method, the guard time can be reduced as short as possible, and the band utilization efficiency of a transmission line can be improved. When a minimum off time as the interval between the optical packet signals is required to be provided because of a light receiver and a clock data recovery circuit thereof, such a processing may be performed that the interval is not more than the time interval, the optical packet is discarded, and when the interval is not less than the time interval, the optical packet is passed.

As described above, according to the optical packet switch device according to the present embodiment, since the timing margin can be reduced, the guard time between the optical packet signals can be reduced. As a result, the band utilization efficiency can be improved. Further, since whether the optical packets temporally compete with each other can be determined, the packet loss rate is reduced, and transmission quality can be improved.

In the present embodiment, since the arbitration processing is performed while monitoring the temporal overlap in the unit of bit (0.1 ns) of the optical packet, timing should be exactly matched once an electrical signal and a main signal reach the optical switch. Thus, a variable delay circuit for an electrical signal is provided at the pre-stage of an electrical signal input of an optical gate switch, and the delay time may be finely adjusted.

In the optical packet switch device according to the above embodiment, the optical packet control signal is generated based on the total delay amount obtained by summing the delay amounts detected by the synchronization pattern detecting unit and the phase difference detecting unit, and the passing/discarding of the optical packet signal is determined. However, the optical packet control signal is generated based on any one of the delay amount (delay bit number) detected by the synchronization pattern detecting unit and the delay amount (phase difference between the frequency-divided clock signal and the local clock signal) detected by the phase difference detecting unit, and the passing/discarding of the optical packet signal may be determined. Also in this case, in comparison with the comparative example, the packet loss rate can be reduced, and the band utilization efficiency can be improved.

Hereinabove, the present invention has been described with reference to the embodiment. The embodiment is an example, and it will be understood by those skilled in the art that various modifications may be made by a combination of the components and the processing processes of the embodiment, and all such modifications are included in the scope of the present invention.

For example, the above conversion ratio in the serial/parallel conversion is an example and not limited especially. In the present embodiment, since high speed switching characteristics of approximately several ns are required, an optical switch which can be switched at high speed, such as an SOA is preferably used. However, the optical switch is not limited especially, and an MEMS, a Mach-Zehnder interferometer, and so on can be used.

What is claimed is:

1. An optical packet switch device comprising:
   a branch portion which branches a received optical packet signal;
   an optical switch section which switches a route of one of the branched optical packet signals and outputs the optical packet signal; and
   an optical switch control section which extracts route information from an other branched optical packet signal and controls the optical switch section according to the route information, wherein
   the optical switch control section includes:
     a optical/electrical conversion unit which converts the other optical packet signal into an electrical data signal;
     a clock extracting unit which extracts a clock signal from the data signal;
     a serial/parallel conversion unit which converts the data signal into a parallel data signal;
     a frequency dividing unit which frequency-divides the clock signal and generates a frequency-divided clock signal;
     a synchronization pattern detecting unit which detects a frame synchronization pattern from the parallel data signal and detects a delay bit number showing that the frame synchronization pattern is stored at a position shifted by how many bits from a first bit of the parallel data signal;
     a header analysis unit which analyzes a header included in the parallel data signal and detects an optical packet length and route information of the optical packet signal;
     an output competition determining unit which determines passing/discarding of the optical packet signals competing with each other based on the optical packet length and the route information detected by the header analysis unit and delay bit number information detected by the synchronization pattern detecting unit;
     a local oscillator which oscillates a local clock signal;
     a clock transfer unit which transfers the parallel data signal synchronized with the frequency-divided clock signal to the local clock signal; and
     a phase difference detecting unit which detects a phase difference between the frequency-divided clock signal and the local clock signal, wherein
   the output competition determining unit determines the passing/discarding of the optical packet signals competing with each other based on the optical packet length, the route information, and a total delay amount obtained by adding a delay amount, corresponding to the phase difference detected by the phase difference detecting unit, to a delay amount corresponding to the delay bit number.

2. The optical packet switch device according to claim 1, wherein
   the phase difference detecting unit detects the phase difference with reference to a parallel signal obtained by serial/parallel converting the local clock signal by the clock signal.

\* \* \* \* \*